United States Patent [19]

Kumar

[11] 3,962,481

[45] June 8, 1976

[54] MEAT-LIKE TEXTURED PROTEIN PRODUCT AND PROCESS

[75] Inventor: Surinder Kumar, Buffalo Grove, Ill.

[73] Assignee: The Quaker Oats Company, Chicago, Ill.

[22] Filed: May 19, 1975

[21] Appl. No.: 578,741

[52] U.S. Cl. .............................. 426/574; 426/441; 426/442; 426/580; 426/656; 426/657; 426/802

[51] Int. Cl.² ............................................ A23J 3/00

[58] Field of Search ........... 426/441, 442, 657, 656, 426/574, 802, 580

[56] References Cited
UNITED STATES PATENTS

| | | |
|---|---|---|
| 3,852,484 | 12/1974 | Cabot ............................ 426/331 X |
| 3,891,777 | 6/1975 | Boyer .............................. 426/656 X |
| 3,891,778 | 6/1975 | Boyer .............................. 426/656 X |

*Primary Examiner*—James R. Hoffman
*Attorney, Agent, or Firm*—Mathew R. P. Perrone, Jr.

[57] ABSTRACT

A textured protein product is formed from a slurry by solubilizing vegetable or animal protein in alkaline aqueous medium, precipitating the protein by adjusting pH and temperature from the slurry, recovering the precipitated protein mass, shaping the recovered protein mass, and treating the protein mass with a hydrophobic liquid.

14 Claims, No Drawings

3,962,481

MEAT-LIKE TEXTURED PROTEIN PRODUCT AND PROCESS

BACKGROUND OF THE INVENTION

This invention relates to food, and more particularly to textured protein that is useful in formulating fabricated foods for human and animal consumption.

Protein deficiency is common throughout many parts of the world, with protein malnutrition being the most wide spread and serious malnutritional problem in the underdeveloped areas of the world. Rapidly increasing population of the world is further worsening the shortage of protein supply. It is, therefore, necessary to utilize the available protein supply in a manner that is most efficient. Meat is one of the most popular sources of diet protein, and the American population has developed taste for the texture, flavor and mouthfeel of meat products. However, present economic conditions have led to high cost for meat products necessitating the development of meat analogs that are less expensive. Furthermore, the presence of cholesterol and highly saturated fats in meat limit their intake by people with certain health problems such as atheroschlerosis. Another sector of world population does not consume meats due to religious or personal beliefs. Therefore, a need exists for the development of palatable, high quality protein foods from new and less expensive protein sources. There are many sources of protein available. Besides meat, other animal proteins are poultry, fish, eggs, milk and milk products. Soybeans, peanuts, cereals and other plant or vegetable proteins are the other major protein sources. However, many of these plant proteins lack the required palatability to make them suitable for use. Various methods of modification of these protein sources are being used to make them more palatable and therefore, more acceptable. Processes also have been developed to utilize animal and plant proteins in fabricating foods similar in appearance, texture, flavor and taste to the natural foods already accepted.

One such process is basically known as texturization of proteins. There are three basic methods for forming texturized proteins. There is a spinning process, an extrusion process, and a glass-puffing extrusion process. The spinning process involves extruding a protein dope or solution through a die into a coagulation bath to form fibers. The problem becomes obvious during the extrusion of the dope and the determination of a proper coagulation bath. In the extrusion process, high pressures and temperatures are used to form a plexilaminate. In this product the cells of the product are longer in the direction of the extrusion. The glass-puffing process is also a high pressure and high temperature process. The use of high pressure and high temperature requires sophisticated, expensive equipment, capital, and skills to handle. The high temperature and pressure also damages the protein thus processed. Furthermore, the protein processed in this fashion still retains some of its undesirable flavor and taste characteristics. For example, the taste of the protein has not been improved. The type of protein being processed may well not have the desired palatability. Thus, while there exist processes for forming suitable texturized proteins, many problems still remain to be solved in producing acceptable protein substitutes for meat.

In the prior art spun protein processes, there is an effluent disposal problem. This effluent results from the basic nature of prior art wet processes. In order to treat the raw protein the raw material is dissolved in an alkali medium. For example, soy protein isolate can be dissolved in sodium hydroxide solution to form a protein dope. This solution of protein is then extruded into an acid coagulation bath. This acid bath coagulates the protein, and the protein fibers are formed. The fibers thus formed are tender and disintegrate upon cooking unless hardened in a salt solution bath. The fibers carry part of the salt solution and must be washed in order to remove the undesirable taste of salts. The acid bath, the salt bath, and the wash water complicate the waste disposal problems of the manufacturing plant. The process can be highly simplified if hardening can be accomplished by a simple single-step procedure that does not leave any disposable residues.

Recent developments in protein texturization include the sheeting and film forming technologies. These technologies, however, require forming and partial drying of a particular product before that product can be shaped and texturized. In addition, the textured product loses its shape and identity upon cooking unless pretreated with denaturing agents such as acids and salts. The liquid residues left in the denaturing or fixing process are similar to those in the spinning process and aggravate the waste disposal problem.

Therefore, it is desirable to develop a process for protein texturization that is simple, inexpensive, with minimum waste disposal problems, and having no adverse effect on the nutrition and flavor of the protein being texturized.

SUMMARY OF THE INVENTION

Therefore, it is an object of this invention to provide an improved protein product.

Also, an object of this invention is to provide an improved protein product at a low cost.

A further object of this invention is to provide an improved textured protein.

It is a still further object of this invention to provide a process for forming a textured protein from a slurry directly.

Another object of this invention is to provide a process for forming a textured protein having an improved meat-like texture.

Still another object of this invention is to provide a process for hardening a protein mass without using a salt bath.

Yet another object of this invention is to provide a process for making a textured protein and avoid the effluent problem.

A further object of this invention is to provide a process for forming a textured protein without adversely affecting the nutritional properties of protein.

Another object of this invention is to provide a textured protein product from highly nutritional proteins or blends of nutritionally complementary proteins.

These and other objects of the invention are accomplished by suspending in water the protein from animal or plant source or a blend thereof; adjusting the pH to solubilize the protein; precipitating the protein by adjusting pH and temperature; recovering the precipitate; forming the recovered protein into desired shape and fixing the shape protein by using an edible hydrophobic liquid.

DESCRIPTION OF THE PREFERRED EMBODIMENTS

A textured protein product is formed by solubilizing plant and/or animal protein in alkaline aqueous medium, recovering the protein from the slurry by manipulating the pH and temperature of the slurry, forming the recovered protein into desired shape, and subjecting the shaped pieces to a selected hydrophobic liquid medium.

Many possible protein sources exist which are suitable for use in this process. The critical feature of the protein source is that it contains between about 45 and 98% by weight protein. More preferably the vegetable protein source should contain about 65–95% by weight protein. Most preferably the protein content of the vegetable protein source should be about 90% by weight of the source. Vegetable protein sources for use in this invention include soy protein, cottonseed protein, sesame protein, peanut protein, and cereal protein. Other suitable protein sources are also operable in this invention provided, however, they meet the protein content requirement set forth above. Within the cereal protein family, those especially suitable for use in this invention include wheat gluten, oat protein, and corn protein. Animal protein sources such as collagen, casein, and albumen may be used individually or in blends with plant or animal proteins. The protein source which is least expensive but still produces desirable products as to nutrition, palatability and ease of manufacture is the soy protein. Of course, there are many soy protein sources — including soy fluor, soy protein concentrate, and soy protein isolate in order of increasing proteins. Additionally, one or more protein sources are suitable for use in this product and process. In fact, any reasonable mixture of the proteins listed above can be used to form the product of this invention.

The soy protein is the preferred product for this invention because it is abundantly available in this country. Soy protein ingredients are the most commonly available in the marketplace at a relatively low cost. Of all the commercially available protein ingredients, soy protein has very acceptable nutritive properties. Soy protein is also abundantly manufactured for use in human food products, whereas the other oil seed proteins and cereal proteins are not as readily available. Any form of a desired vegetable protein is suitable for use in this invention whether it is the concentrate, isolate, or flour. The only critical feature of the vegetable protein source is that it has the desired protein content. As above stated the desired protein content of the protein source is broadly from about 45 to about 98% protein by weight. More preferably the protein content of the vegetable protein is about 50% to about 98% protein content by weight of the vegetable protein. Most preferably about 90% protein content by weight is suitable for use in the invention. The texture, flavor, and nutritional quality of the textured product is controlled by the selection of protein or protein blend, extent of heat treatment of the slurry, selection of acid, amount of water retained in the recovered protein, selection of the hydrophobic medium and the time and temperature of treatment in the hydrophobic liquid. A soft elastic texture, if desirable, is obtained by using casein or casein/soy isolate blend as the protein source; citric, lactic or tartaric acid for recovering protein; retaining 60–70% water in the recovered protein, and fixing the protein in a fat bath adjusted to about 200°C.

Selection of soy-casein blend preferably in a 1:1 weight ratio also results in a nutritionally improved product than soy alone because soy protein and casein act as nutritionally complementary proteins.

To the selected protein or protein blend, water is added in sufficient quantity to form a slurry. The water may be neutral or alkaline when the slurry is formed. The final pH of the slurry must be alkaline (i.e., adjusted to above 7.0) in any suitable fashion. Use of alkaline compounds is one means of raising the pH. Typical compounds for raising the pH include hydroxides, carbonates and bicarbonates of sodium, potassium, calcium and magnesium or mixtures thereof. Forming a slurry at an alkaline pH solubilizes the protein. By solubilize is meant to stabilize slurry against precipitation due to gravitational force. In other words, the slurry of this invention formed in an alkaline medium is very stable. The stability of the slurry simplifies the process. Further adjustment of the pH above 7.0 depends on the materials used. The pH of the slurry at this point can be anywhere from just above 7 to about 13. About pH 7.5 is a preferred lower limit for this point of the process. The slurry is continuously stirred to promote effective distribution of alkaline components.

The protein slurry may or may not be heated at the formation point. Heating at this point serves to raise the pH of the slurry. If a strong alkaline compound (or base) such as a hydroxide is used, then heating is not required. However, heating is useful because even a strong base is more effective when heated. If the weaker base such as a carbonate or bicarbonate is used heating is essential. It is that heat initiates a reaction which forms a stronger base leading to a high pH. The carbonate or bicarbonate base is preferred because a chewier product results while the other desired meat-like features are maintained. Suitable heating temperature ranges from ambient to the slurry boiling point. A polysaccharide may also optionally combine with the base to treat the slurry and further assist the process.

An interaction between the various components of the protein source provides conditioning of the slurry and is usually accomplished by heating and/or using selected polysaccharides. Typical polysaccharides that may be used are carrageenan, carboxymethylcellulose, sodium alginate, guar gum, gum arabic, and others that interact with proteins. The addition of small amounts of polysaccharides assures more complete recovery of proteins.

One or more polysaccharides may be added to the slurry in order to condition the slurry. This conditioning is used individually or in combination with heat to provide the total conditioning of the slurry or dough. About 0.1 to about 10% by weight polysaccharides based on the weight of protein being used is suitable for use in the conditioning process. More preferably about 0.5 to about 5% by weight polysaccharide is used. Most preferably about 2% to about 3% by weight polysaccharide is used. The most preferred range achieves the desired gelling and conditioning of the protein at the most economical use of material, time, and processing. The pH of the protein slurry is then adjusted or lowered until precipitation of protein occurs as a gelatinous mass. The desired pH at precipitation is generally lower than 7.0 and preferably in the range of 4.0 to 6.0. Most preferably, the pH ranges from 4.5 to about 5.5. The pH adjustment is accomplished by using any suitable edible acid salt, edible acid or mixtures thereof. An especially suitable acid is citric acid. Other suitable acids include lactic, tartaric, succinic, malic, fumaric, phosphoric, hydrochloric, and sulfuric. Exemplary edible salts include chloride, phosphate or sulfate of calcium or magnesium. These salts adjust the ionic equilibrium of the slurry to lower the pH. If the acid or salt is added to a slurry, the protein effectively precipitates and settles out to be recovered by filtration. The most effective way to add the acid or salt to the slurry is to heat the slurry to the boiling point of the slurry. In this fashion, the precipitation joint or separate from the slurry is more effective. However, any heating treatment combined with the acid or salt treatment is operable for a treatment of the slurry. Heating ranges from above ambient to the boiling point of the slurry.

After the protein is precipitated from the water slurry, and extra water removed by filtration, the next step is a shaping of the precipitated protein. This shaping is generally effected by pressing the hydrated protein source to form a continuous mass and cutting the resultant mass into small pieces. Alternatively, the hydrated protein may be added to either the protein slurry or to the hydrated protein before the shaping step.

Pressing pressures for the hydrated protein range up to about 10,000 pounds per square inch gauge. Preferably the pressing pressure ranges from about 2,000 to 10,000 pounds per square inch gauge. More preferably, the pressing pressure is about 3,000 to about 5,000 pounds per square inch gauge. Above 10,000 pounds pressure is usable but undesirable. The undesirability is due to the increased equipment and other factors in creating the higher pressure.

After shaping the protein is treated in a hydrophobic medium. Basically, the formed material is heated in an edible oil for a period of time. Preferably the heating temperature ranges from 145° to about 275°C. The heating time ranges from about 10 to about 200 seconds. More preferably, the heating time ranges from about 15 to about 120 seconds. Most preferably, the heating time is from about 30 to about 100 seconds. The heating time decreases as the temperature increases. Suitable vegetable oils for treating the hydrated protein include those materials which are liquid at the heating temperature. Typical examples of the edible oil or fat include corn oil, soybean oil, oat oil, cottonseed oil, hydrogenated oils, margarines, shortenings, milk fat and other fats from animal sources. More preferably the temperature ranges from 175° to 225°C.

The final product is a textured protein having a meat-like texture. Standard acceptable coloring and flavor can be added to the product at a suitable point in the process to achieve desirable aroma and coloration. In this fashion, the desirability of the product is improved because it more closely resembles meat.

After treatment in the fat, the product is cooled and placed in a bath. Preferably the bath is a water bath which is boiling. This step, however, is optional. The texture is improved by placing the product in this heated water bath.

With regard to all heating steps of this process it is well recognized in the art that boiling temperature of water on a practical basis is generally around 100°C. due to the differing elevations throughout the United States. Of course, it is well recognized that the boiling temperature of water varies with the pressure and that this adjustment in the boiling temperature will have no substantial effect on the process at the points where boiling water is called for, so long as the temperature of the boiling water is above 90°C.

While it is not desired to be bound by any particular theory covering the operation of this invention, nevertheless, the following postulate is offered. The treatment of the protein with alkali causes unfolding of the protein molecules due to introduction of excessive negative charges. The unfolded protein molecules are much more flexible than the compact globular molecules. Furthermore, more reactive groups are available for interaction in the unfolded molecules. Heat treatment further aids unfolding and, in addition, causes partial hydrolysis of the protein molecule preventing it from returning to the original compact state when alkalinity is removed or neutralized. Hydrolysis of proteins is a standard term in the art and implies splitting of chemical bonds and addition of elements of water. The unfolded, partially hydrolyzed molecules are more prone to interactions among themselves and with other components than compact molecules. Upon lowering the pH or adjusting the ionic equilibrium of the medium in which protein molecules are suspended, the molecules interact with one another, the negative charge on the protein molecules is neutralized and a gelatinous precipitate results. When the precipitate is subjected to treatment with fat or oil, the hydrophobic or fat-loving groups of protein tend to come to the surface of the molecule and hydrophilic or water-loving groups of protein realign themselves towards the inside of the molecule. A massive change in protein structure and the resulting interactions between various groups of protein produce a textured protein that is insoluble in water and does not disintegrate upon cooking.

Having now disclosed the invention, the following examples are offered as an illusion thereof without intention of unduly limiting the invention. Unless otherwise specified, all parts and percentages are by weight both in the examples and throughout the specification.

EXAMPLE 1

A 10% slurry of soy protein isolate is prepared in water. The pH of the slurry is adjusted to 9.0 by adding dilute sodium hydroxide solution. The protein is solubilized by stirring the slurry for 5–10 minutes. The contents are brought to a boil and dilute hydrochloric acid added till precipitation occurs. The precipitate is recovered by filtration and washed with cold water to remove excess acidity. The recovered precipitate is pressed to remove excess water and to obtain desirable shape and size of pieces. The pieces are heated in a corn oil bath adjusted to about 200°C. for a period of about 40 seconds. Then the pieces are removed from the corn oil bath and cooled to ambient temperature. Finally, the pieces are placed in an enclosed water bath for a period of about 10 minutes to form a chewy meat-like texture which is cookable without disintegration.

EXAMPLE 2

A 10% slurry of soy protein isolate is prepared in water. The pH of the slurry is adjusted to 9.0 by adding dilute sodium hydroxide solution. The protein is dissolved by stirring for 5 minutes at pH 9.0. Equal weight of 10% sodium caseinate slurry is added to the soy protein slurry and the mixture stirred. The pH of the mixture is adjusted to 7.0 with dilute hydrochloric acid. The protein mixture is then heated to boiling temperatures and dilute hydrochloric acid added till precipitation of protein occurs. The protein precipitate is treated in a manner similar to that explained in Example 1 to obtain meat-like pieces.

EXAMPLE 3

The following ingredients are weighed:

| | |
|---|---|
| Soy isolate | 100 gms. |
| Sodium Caseinate | 100 gms. |
| Shortening | 60 gms. |
| Sodium Alginate | 5 gms. |
| Caramel Color | 2 gms. |
| Flavoring | 2.5 gms. |

The soy isolate is mixed with 900 milliliters of water in a blender. Small amount of antifoam is added to prevent excessive foaming during mixing. The pH of the slurry is adjusted to 12.0 with a 50% solution of sodium hydroxide. The slurry is stirred for 5–10 minutes to solubilize the protein. Sodium caseinate is dissolved in 900 milliliters of water and mixed with the soy protein solution. Sodium alginate is blended with 250 milliliters of water and melted fat added during blending. The blended sodium alginate-fat emulsion is mixed with the protein solution and color and flavoring added. Dilute hydrochloric acid is added till a gelatinous precipitate is formed. The precipitate is recovered by filtration, washed with cold water, shaped by pressing and diced. The diced pieces are treated in an oil-bath followed by the water-bath treatment described in Example 1.

EXAMPLE 4

Example 1 is repeated with substantially similar results except that soy protein concentrate (70% protein by weight) is used as the protein source in place of soy protein isolate.

EXAMPLE 5

Example 1 is repeated with substantially similar results except that soy flour (50% protein by weight) is used as the protein source in place of soy protein isolate.

EXAMPLE 6

In place of dilute sodium hydroxide solution, 0.5% sodium carbonate by weight of total protein is used for protein solubilization in Example 1 with better results evidenced by a chewier texture.

EXAMPLE 7

Example 6 is repeated with substantially similar results except that sodium bicarbonate is used.

EXAMPLE 8

Example 1 is repeated with substantially similar results except that citric acid is used for precipitating the protein in place of hydrochloric acid.

EXAMPLE 9

Example 3 is repeated with substantially the same results except that 1 gram carrageenan is used in place of sodium alginate.

Thus having fully disclosed this new and unique invention, what is claimed and sought to be secured by Letters Patent of the U.S. is:

1. A process for forming a meat-like textured protein comprising:
   A. solubilizing at least one protein in an aqueous alkaline medium to form a slurry of a protein;
   B. precipitating the protein from the slurry;
   C. recovering the precipitated protein;
   D. shaping the recovered protein; and
   E. texturizing the shaped protein by heating the shaped protein in a hydrophobic liquid.

2. The process of claim 1 wherein the precipitating is accomplished by:
   A. heating the slurry, and
   B. lowering the pH of the slurry to an acidic level by adding thereto at least one component selected from the group consisting of an edible acid and an acid salt.

3. The process of claim 2 wherein the protein source contains between about 45 percent and about 98 percent protein by weight of protein source.

4. The process of claim 3 wherein the protein source contains between about 65 percent and about 95 percent protein.

5. The process of claim 4 wherein the aqueous alkaline medium comprises at least one alkaline compound having an anion selected from the group consisting of a hydroxide, a carbonate and a bicarbonate; and a cation selected from the group consisting of sodium, potassium, calcium, or magnesium.

6. The process of claim 5 wherein the protein is precipitated by adding an edible acid to the slurry.

7. The process of claim 6 wherein the protein is precipitated at a pH of 4.0 to 6.0.

8. The process of claim 7 wherein the acid is citric acid.

9. The process of claim 7 wherein the heating in the hydrophobic liquid is accomplished in an edible oil at about 145° to about 275°C. for about 10 to about 200 seconds.

10. The process of claim 9 wherein the heating is at about 175° to 225°C. for about 30 to 100 seconds.

11. The process of claim 10 wherein the oil is corn oil.

12. The product of the process of claim 1.

13. The process of claim 1 wherein the protein is a mixture at a 1:1 weight ratio of soy protein isolate and sodium caseinate.

14. The process of claim 1 wherein at least one polysaccharide is added to the aqueous alkaline medium.

* * * * *